Jan. 24, 1956 T. C. MORRIS 2,732,324
LAMINATION OF FIBROUS AND PLASTIC SHEET MATERIALS
Filed April 18, 1952 2 Sheets-Sheet 1

Inventor
Thomas C. Morris
By his Attorney

Jan. 24, 1956 T. C. MORRIS 2,732,324
LAMINATION OF FIBROUS AND PLASTIC SHEET MATERIALS
Filed April 18, 1952 2 Sheets-Sheet 2
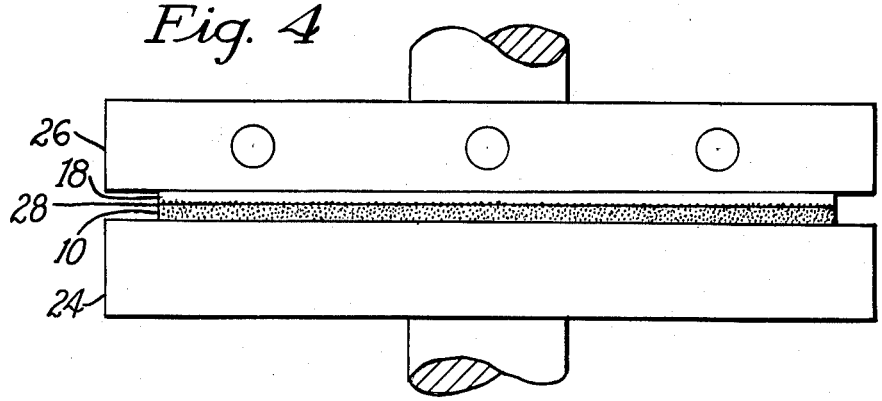
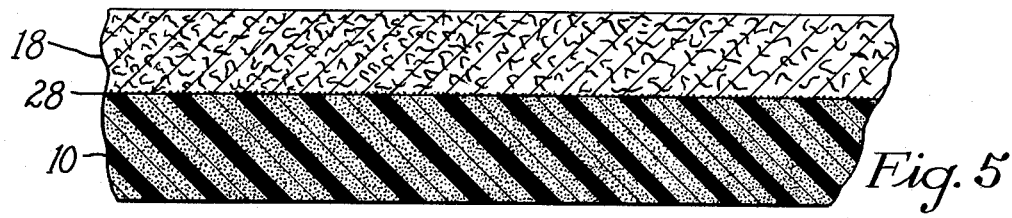
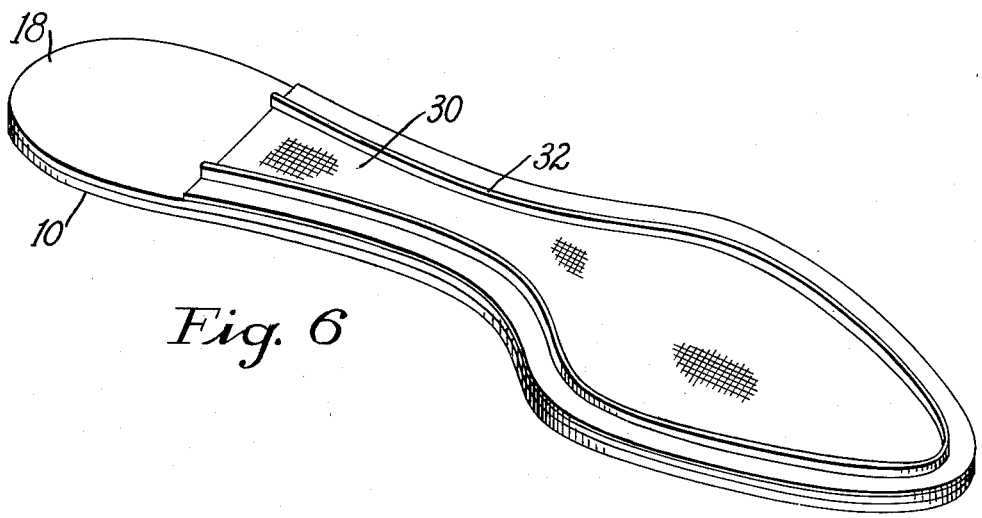
Inventor
Thomas C. Morris
By his Attorney United States Patent Office 2,732,324
Patented Jan. 24, 1956

2,732,324
LAMINATION OF FIBROUS AND PLASTIC SHEET MATERIALS

Thomas C. Morris, Lexington, Mass., assignor to United Shoe Machinery Corporation, Flemington, N. J., a corporation of New Jersey Application April 18, 1952, Serial No. 282,988

1 Claim. (Cl. 154—103)

This invention relates to the lamination of fibrous and plastic sheet materials and particularly to a method of making an air and moisture permeable laminate useful for shoe insoles and composed of a porous plastic sheet material and a fibrous sheet material.

The development of plastic materials possessing outstanding qualities of flexibility, toughness and resistance to abrasion and moisture has resulted in an extensive search for plastic materials as replacements for leather. In the shoe industry, numerous leather parts such as soles, heels, and toe caps have been replaced to a substantial extent with plastic or rubber sheet materials. Efforts have been directed toward finding a satisfactory replacement for leather in shoe insoles. The plastic sheet materials used in the shoe parts above mentioned have been unsatisfactory in this connection because, being impermeable, they prevent "breathing," i. e., movement of air to and from the foot and escape of moisture. Such materials make the foot in contact with them "hot" and may cause serious foot trouble.

There has been developed, see the patents to Berg and Doriat, No. 2,371,868, granted March 20, 1945, and to Foust No. 2,559,609, granted July 10, 1951, a type of porous plastic sheet material which in many respects is highly desirable for use as insole material. This material is the product of sintering under heat and controlled pressure a layer of synthetic resinous thermoplastic polymeric material so joined together as to define small interstices or pores between them. This structure permits "breathing" and some dissipation of moisture.

Along with the desirable properties this porous material possesses there are some factors which cause difficulty particularly in shoemaking. A primary factor is that the resistance of the plastic sheet material to tearing by stitches or other fastening means is not great, and special techniques are employed to avoid the difficulty, such as the technique of providing a densified portion as disclosed in the Foust patent above mentioned.

It is possible to provide necessary stitch or other fastener tear resistance by laminating the plastic sheet with various fibrous sheet materials of the type used in shoes. In the lamination of the porous sheet with the fibrous sheet, conventional adhesives prevent passage of air or moisture from one sheet to the other. This difficulty may in some measure be avoided by bonding the plastic sheet and fibrous sheet only at marginal portions; but this necessitates individual preparation of each insole so that it is not possible to die a plurality of insoles from a continuous sheet of laminated material. Also, since an all-over bond is not secured there is some tendency for relative displacement of intermediate portions of the plastic sheet and fibrous sheet particularly where a relatively thin plastic sheet is employed.

With a relatively thin plastic sheet, it has been observed that moisture taken up from a foot by the porous plastic material transfers to the fibrous sheet which in effect serves as a storage for moisture from which moisture is given up during the period when the shoe is not in use. Where this transfer of moisture is interfered with, as by the use of adhesive, some foot discomfort has been encountered. Also for effective transfer of moisture it is important that the porous plastic sheet be in intimate engagement with the fibrous sheet.

It is a feature of the present invention to provide a method of making a laminate wherein a porous plastic sheet is secured in intimate engagement with an absorbent fibrous sheet by an adhesive joint which does not prevent the transmission of air and moisture between the porous plastic sheet and the fibrous sheet.

In accordance with the present invention a plasticized resin sheet, suitably a porous sheet, is provided with a discontinuous layer of thermoplastic resin particles compatible with, but preferably having a lower melting point than, the resin of the sheet. This resin particle covered surface of the sheet is disposed adjacent a surface of a fibrous sheet and a laminate formed by subjecting the assembly to heat and pressure. In a preferred form and particularly where the fibrous sheet has been reinforced by treatment with a rubber, e. g. with "GRS" latex as in "Texon" or "Onco," the surface of the fibrous sheet is sprayed with an aqueous dispersion of resin and dried to form a discontinuous, firmly adherent deposit of thermoplastic resin at the surface of the fibrous sheet prior to assembly with the particle covered surface of the resin sheet. This resin deposit is not required with firm, untreated fibrous sheets such as kraft paper although it may be used.

The resulting laminate is a permanently bonded sheet material of which the layers corresponding to the original sheets adhere so firmly that separation cannot be obtained without destruction of the sheets. The bond between the layers holds the layers firmly in intimate engagement and at the same time because of the discontinuity of the resinous bonding material it has been found that the resistance to flow of air or passage of moisture from one face to the other of the laminate is not markedly greater than the sum of the resistances to flow of air or passage of moisture in the fibrous sheet and in the porous resin sheet.

The above and other important features and advantages will be discussed by reference to the drawings and will be pointed out in the appended claims.

In the drawings,

Fig. 4 is an elevational view showing the lamination of the fibrous sheet and the porous resin sheet under heat and pressure;

Fig. 5 is an enlarged cross sectional view of the laminate of fibrous sheet material and porous plastic sheet material; and Fig. 6 is an angular view of an insole employing the laminated sheet material.

A porous resin sheet material 10 is prepared according to known procedure such as that described in the patent to Foust or the patents to Berg and Doriat, above noted. Briefly, such a porous resin sheet is formed by disposing a layer of thermoplastic resin granules in a mold and applying pressure to reduce the thickness of the layer to about one half of its original thickness. The resin is then heated to sinter the granules together and, after cooling, the layer is removed from the mold as an integrated micro-porous sheet.

Porous plastic sheets for use in the present invention may be formed of any of the strong linear polymeric thermoplastic resins such as those disclosed in the Foust patent and in the Berg and Doriat patent referred to above. Very satisfactory resins for use in the present invention are the vinyl chloride polymers including polyvinyl chloride, vinyl chloride-vinyl acetate copolymers and vinyl chloride-vinylidene chloride copolymers which are commercially available. Any of the common ester plasticizers may be used, with the proviso that where the resinous materials are to be used adjacent the skin, care must be used to avoid materials causing dermatitis.

Figure 1:
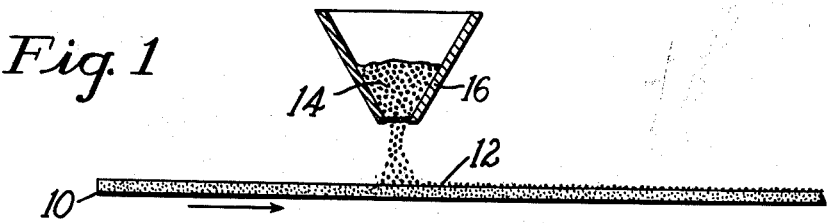
Fig. 1 is a diagrammatic view of the application of a discontinuous layer of finely divided resin particles on a surface of a porous plastic sheet.

A thin discontinuous layer 12 of resin binder particles 14 is deposited on one side of the resin sheet 10 in any convenient manner. As shown in Fig. 1, the layer 12 may be formed by passing the sheet 10 beneath a hopper and screen dusting device 16 containing a supply of the particles. The particles may also be applied by dipping a brush into a body of the particles and brushing the particles over the surface of the resin sheet.

Resins useful as the binder particles for bonding the plastic sheet to the fibrous sheet are resins similar to those employed in the resin sheet, but ordinarily will be selected to have lower softening points than the resin of the resin sheet with which a given resin is to be employed. Resin particles in the range of 30 to 100 mesh size are preferred. The quantity of particles required varies with the character of the surfaces to be joined. In general, the more irregular surfaces require a higher quantity of particles. A quantity of from 1 to 3 grams per square foot has been found adequate for most combinations of resin sheet and fibrous sheet.

Figure 2:
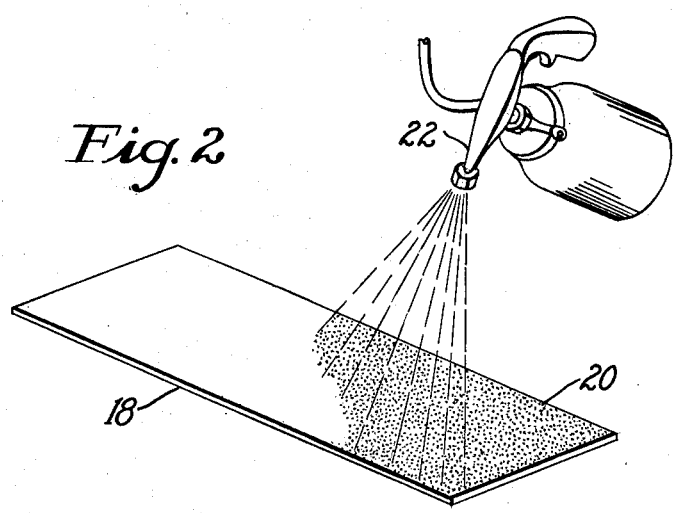
Fig. 2 is a diagrammatic view showing the spray application of an aqueous resin dispersion to a surface of a fibrous sheet to form a discontinuous, firmly adherent deposit of resin at the surface of the fibrous sheet.

The fibrous sheet 18 (Fig. 2) is preferably provided with a firmly adherent deposit 20 of resin in its surface to aid in establishing a firm bond between the binder particles and the fibrous sheet. In many instances, as in the case of a firm unimpregnated kraft paper, it is not strictly necessary to form a resin deposit on the surface of the fibrous sheet 20. However, with fibrous sheets which have been treated with a material such as a rubber or synthetic rubber to reinforce it, as for instance commercially available fibrous sheets which have been treated with "GRS" latex, or where the structure of the fibrous sheet is not sufficiently strong, it is important that a discontinuous firmly adherent deposit of resin be provided in the surface of the fibrous sheet. The deposited resin will be chosen to be similar to the resin of the porous sheet. The desired deposit 20 is most simply formed by lightly spraying the fibrous sheet 18, as by several quick passes with a spray gun 22, with a relatively dilute, preferably 15% to 50% by weight solids, aqueous resin dispersion preferably of the type known as a resin latex which is formed by emulsion polymerization or co-polymerization of the resin in an aqueous medium. With such dilute dispersions, the deposit 20 may be as much as ⅛ to one ounce or more per sq. ft., but in no case must sufficient be used to block the porosity of the sheet 18.

With regard to relative softening points of the layer of binder resin particles 12 and the resin of the sheet 10, no satisfactory definition of the softening points of the resins involved is possible at present because of the nature of the resins. However, a workable guide is that the resin selected for the binder particles should have a "working temperature" at least 10° C. below the "working temperature" of the resin of the sheet with which the particles are employed. The term "working temperature" for purposes of this application refers to the temperature which a given resin requires for effective handling in a given working operation. Thus one resin may require a temperature of X° C. for forming a band on a mill, or for extrusion, or for sintering. Using a porous plastic sheet formed of this resin, the resin for the binder particles desirably is one which requires a temperature of not more than X° C. minus 10° C. for the selected working operation.

Figure 3:
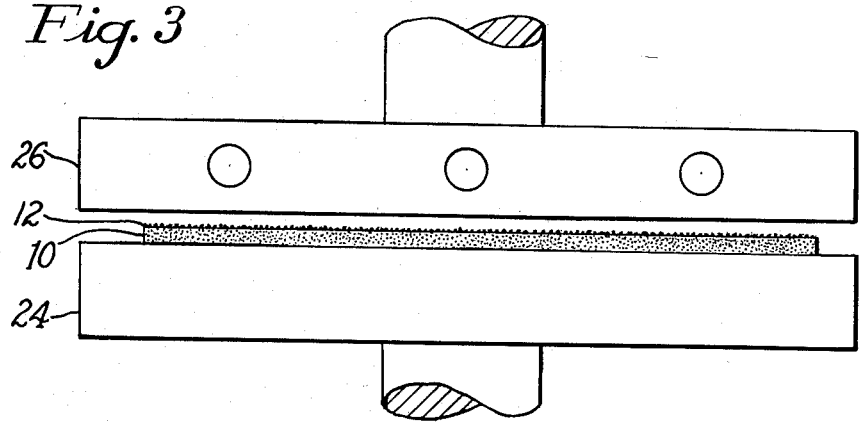
Fig. 3 is an elevational view showing a preliminary heating step which may be employed to facilitate bonding of the resin and fibrous sheets.

Lamination of the porous resin sheet 10 having a discontinuous layer 12 of resin particles thereon with the fibrous sheet 18 is effected by assembling the fibrous sheet and the resin sheet with the resin particle layer between them and subjecting the assembly to heat and pressure. A preferred procedure for this lamination is illustrated in Figs. 3 and 4 and involves disposing the resin sheet 10 on the lower unheated platen 24 of a press with the layer 12 of resin particles uppermost. The lower platen is then raised to bring the layer 12 close to but not in contact with the heated upper platen 26 of the press. Heat radiated from the surface of the platen 26 effects a preheating of the resin granules and of the surface of the resin sheet and eliminates the necessity for supplying heat to the resin particle layer by transmission through the resin sheet or the fibrous sheet in the subsequent lamination step. When a suitable preheating has been effected, the lower platen is moved away from the upper platen and the fibrous sheet is positioned on the layer of resin particles with its resin treated surface 20 (where the surface has been treated with resin) in contact with the layer of resin particles. The lower platen 24 is then raised to press together the fibrous sheet and resin sheet and to effect a permeable joint 28 between them under the action of heat and pressure.

With any combination of porous resin sheet 10 and resin binder particle 12 within the above rule, the selection of bonding times and bonding temperatures is well within the skill of the average technically trained person. That is, the temperature employed for bonding may be any temperature above the minimum temperature at which the binder particles 12 will unite the fiber sheet 18 and the resin sheet 10, and below that temperature at which the porous resin sheet 10 is harmed. Where the difference in the "working temperatures" is large any temperature within this range but substantially above the minimum temperature may be employed and will give a relatively short bonding cycle. Where the difference is small, sufficient heat cannot be imparted to the resin particles so rapidly and a longer bonding cycle may be required. In any case, the time of heating is a readily ascertainable time required to bring the resin particles to bonding temperatures under the heating conditions selected.

The laminated sheet material formed by the heating and pressing as above described is particularly useful for the manufacture of insoles. In this use, the laminated sheet material will be cut to an outline shaped for combination with other parts going to make up the shoe. In the insole shown in Fig 6, for use in a Goodyear welt type shoe, laminated sheet material is cut to the desired outline shape, with the porous plastic layer 10 on that face of the laminate which will be nearest the foot of the wearer when the insole is incorporated into a shoe. On the other face, that is the surface of the fibrous sheet 18, there has been provided an all-over covering of duck 30 in which an upstanding rib 32 has been formed. In a shoe comprising an insole such as that shown, moisture from the foot of a wearer will be taken up by the porous plastic sheet 10 and transmitted to the fibrous sheet 18. While the moisture may not be capable of being readily passed through from the fibrous sheet 18 to the canvas sheet 30 or to a bottom filler or other adjacent layer, it has been found in practice that the fibrous sheet 18 serves as a reservoir of sufficient capacity to take up moisture transmitted to it during a period of wear and then to return the moisture through the porous sheet 10 for evaporation while the shoe is not in use.

The invention has been described as involving a lamination of one fibrous sheet with one porous plastic sheet. However, more than one fibrous sheet or more than one porous plastic sheet may be employed in alternate layers.

A simple method for preparing such multiple laminates may involve as the first step the formation of a laminate of one fibrous sheet and one porous plastic sheet. A thin discontinuous layer of binder particles of resin is then formed on the porous plastic layer surface of the laminate and this is then subjected to a preliminary heating similar to that shown in Fig. 3 followed by assembly and bonding with a second fibrous sheet under heat and pressure. A laminate of two fibrous sheets with an intermediate layer of porous plastic may be split in a conventional splitting machine to provide two sheets which are laminates of a single layer of porous plastic and a single layer of fibrous sheet material. This proceeding permits the formation of laminates in which the porous plastic sheet layer is of a thinness not readily capable of being handled as a single sheet.

The following example is given to aid in understanding the practice of the invention but it is to be understood that the invention is not limited to the particular materials, proportions or specific procedures set forth in the example.

*Example*

A porous resin sheet was prepared by a slight modification of the procedure of Example 1 of the Berg and Doriat Patent No. 2,371,868 in which 200 parts by weight of a powder of high molecular weight polymeric polyvinyl chloride which was sifted through a 30 mesh sieve was mixed with 100 parts of a plasticizer mixture composed of 50 parts of dioctyl phthalate and 50 parts by weight of an alkylaryl phosphate plasticizer (Santicizer 141), at 100° C. in a mixing apparatus. The thus obtained mixture which was still in powdery state was filled into an iron frame which was placed on the bottom platen of a press at a temperature of about 170° C. Pressure was applied to reduce the thickness of the powdery mass to a thickness of 5 mm. and the powdery mass was maintained at 170° C. for 10 minutes. The press was then opened and the resinous material removed as a microporous flexible sheet having a thickness of 5 mm. and readily permeable to the passage of air.

A sheet of .052 inch "GRS" impregnated porous fibrous sheet material known as "Texon" was sprayed with a polyvinyl chloride latex having a solids content of about 25% (Geon latex 652 diluted with an equal volume of water) to provide a discontinuous deposit of polyvinyl chloride resin on the surface of the fibrous sheet in concentration of about 1 fl. oz., i. e., approximately ¼ oz. of solids per square foot of the fibrous sheet. The sheet was then allowed to dry at room temperature.

Fine particles of a resinous copolymer of vinyl chloride and vinyl acetate in the proportions of 85% to 88% vinyl chloride to 15% to 12% of vinyl acetate (Vinylite VYHH) was applied to the surface of the sintered resin sheet in the amount of about 2 gms. per square foot. The porous plastic sheet with the resin particles applied to one surface was disposed on the lower platen of a press of which the upper platen was heated to a temperature of about 275° F., the particle covered surface of the resin sheet being uppermost. The lower platen was then raised to bring the particle covered surface of the resin sheet to a distance of about 1/32" away from the heated top platen and was held in this position for about one minute. The lower platen was then dropped and the fibrous sheet was placed with its treated surface next to the particle covered surface of the resin sheet and the bottom platen raised to press the assembly of resin sheet and fibrous sheet against the heated top platen. A pressure of about two tons per square foot was applied to the assembly for a period of about one minute. The bottom platen was then lowered and the laminate assembly removed from the press.

The fibrous sheet and porous resin sheet were so firmly bonded that they could not be separated without destruction. Insoles were cut from the laminate and used successfully in the manufacture of shoes.

The porosity of the various materials was tested by forcing air through a 2 inch diameter disk of the respective sheet materials and an arbitrary value of porosity expressed as seconds required for a 1600 cc. of air at a pressure of 25 inches of water to pass through the sheet material was determined.

The values determined are as follows:

|  | Porosity |
| --- | --- |
| Porous plastic sheet before bonding | 17.0 seconds |
| 2½ Iron Texon fibrous sheet before bonding | 9.6 seconds |
| Laminated assembly after bonding | 29.0 seconds |
| Decrease in porosity due to bonding | 28.6% |

Having thus described my invention, what I claim as new and desire to secure by Letters Patent of the United States is:

The method of preparing porous laminates which comprises assembling a microporous non-fibrous sheet of ester plasticized vinyl chloride polymer resin and porous fibrous sheets on opposite faces of said microporous sheet with thin, discontinuous, layers of thermoplastic resin particles between said resin sheet and fibrous sheets, said resin particles being of a similar composition as but having a lower softening point than the resin of said sheet, heating and pressing the assembly to a temperature at which the particles soften to unite the resin particles to the faces of said resin sheet and to cause the particles to adhere to the faces of said fibrous sheets, but below that temperature at which the porous resin sheet will be harmed, said heating and pressing operating to bond said sheets into a porous composite sheet, and thereafter splitting the composite sheet through the micoporous resin sheet lamina so as to form two porous sheets each of which is a laminate of ester plasticized vinyl chloride polymer resin and a porous fibrous sheet.

References Cited in the file of this patent

UNITED STATES PATENTS

| Re. 19,494 | Glidden et al. | Mar. 12, 1935 |
| 1,926,283 | Herbert | Sept. 12, 1933 |
| 2,035,766 | Schramm | Mar. 31, 1936 |
| 2,077,125 | Miller et al. | Apr. 13, 1937 |
| 2,135,473 | Russell | Nov. 1, 1938 |
| 2,371,868 | Berg et al. | Mar. 20, 1945 |
| 2,391,515 | Richards et al. | Dec. 25, 1945 |
| 2,454,910 | Carr | Nov. 30, 1948 |
| 2,466,911 | Raymond | Apr. 12, 1949 |
| 2,478,940 | Pape | Aug. 16, 1949 |
| 2,499,134 | DeBruyne | Feb. 28, 1950 |
| 2,559,609 | Foust | July 10, 1951 |
| 2,603,575 | Schramm | July 15, 1952 |